Patented Oct. 17, 1922.

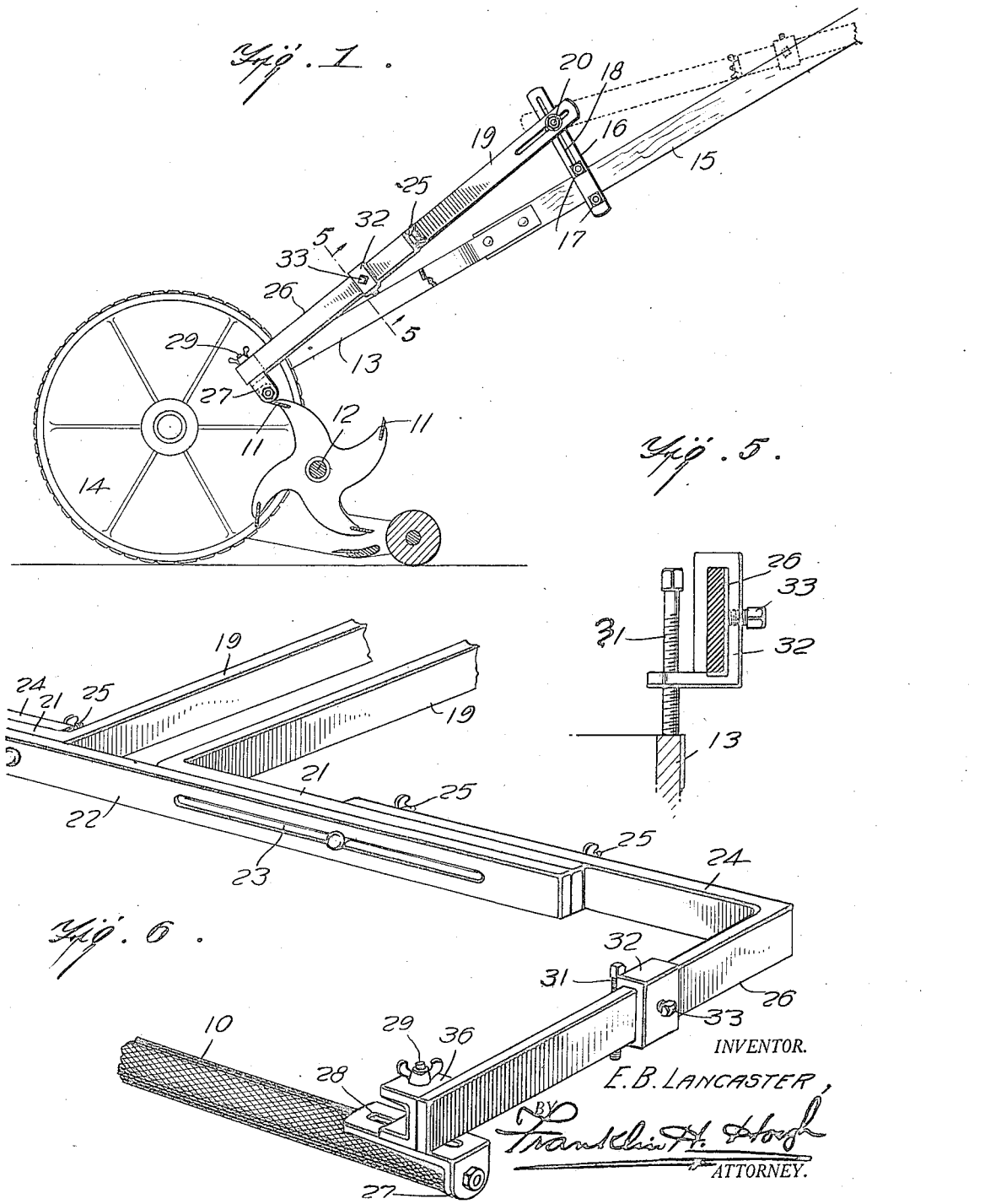

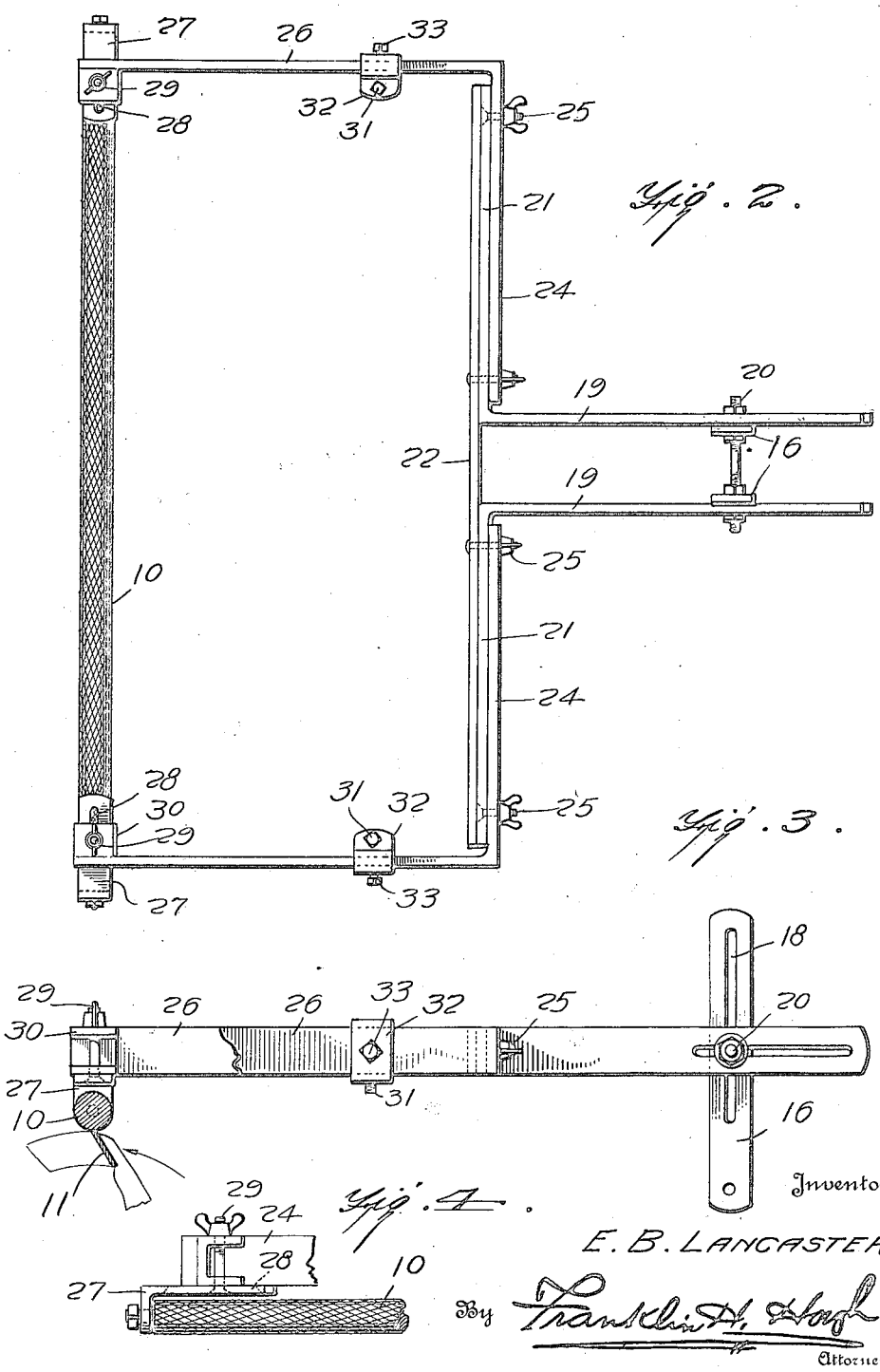

1,432,193

UNITED STATES PATENT OFFICE.

EDMUND BANNING LANCASTER, OF LORENA, TEXAS.

LAWN-MOWER SHARPENER.

Application filed February 8, 1921. Serial No. 443,396.

*To all whom it may concern:*

Be it known that I, EDMUND B. LANCASTER, a citizen of the United States, residing at Lorena, in the county of McLennan and State of Texas, have invented certain new and useful Improvements in Lawn-Mower Sharpeners, of which the following is a specification, reference being had therein to the accompanying drawings.

This invention relates to lawn mower sharpeners and has for an object to provide a device which may be attached directly to a lawn mower without disassembling the parts, and to grind the several knives as the cutter head rotates under normal action.

A further object of the invention is to provide means for properly supporting an abrading member in position to be engaged by the bevel of the knives of the cutter head of a lawn mower, as the head rotates, so that the normal bevel may be increased by further abrading to produce the required cutting edge.

A further object of the invention is to provide a sharpener applicable to a lawn mower, which may remain in constant engagement with the mower and provides means for folding out of abrading position when not in use.

A further object of the invention is to provide means for adjusting the support to lawn mowers of various widths, whereby the support structure may be mounted upon lawn mowers varying in width of cut.

With these and other objects in view the device comprises certain novel elements, parts, units, combinations, arrangements and functions as will be hereinafter more fully described and claimed.

In the drawings:

Figure 1 is a view in section of a lawn mower and cutting head of conventional type with the sharpener applied thereto;

Figure 2 is a top plan view of the sharpener;

Figure 3 is a sectional view through the sharpener and abrading element;

Figure 4 is a fragmentary view of the abrading element in elevation and the supporting frame;

Figure 5 is a transverse sectional view showing the adjustment of the frame relative to the lawn mower and taken on line 5—5 of Figure 1, and Figure 6 is a fragmentary perspective view of the structure.

Like characters of reference indicate corresponding parts throughout the several views.

In the ordinary grinding or sharpening of a lawn mower, it is necessary to disassemble or knock down the lawn mower to remove the cutting head therefrom, which is then supported in some structure requisite for properly positioning the knives relative to an abrading tool. The present invention provides means to be attached directly to a lawn mower, and provided with an abrading device and means to adjust it relative to the cutting head, so that as the cutting head rotates, the cutting knives are ground.

The abrading element comprises a member 10, preferably constructed as a cylindrical, or round file, which is held in such position that it is engaged by the knives 11 of the cutting head as the cutting head rotates. The cutting head is carried upon the shaft 12 with a frame 13 and traction wheel 14, shown conveniently at Figure 1, the arrangement of the parts being wholly immaterial to the present invention and indicated only to illustrate a conventional lawn mower. Each lawn mower is, of course, provided with a bar 15 which is normally provided with cross handles,—not shown,— by which the device is propelled. To the bar 15 means is attached to support abrading member 10. The attaching means are members 16 positioned upon opposite sides of the bar 15 and clamped thereon in any approved manner, as by the bolts 17. The members 16 are provided with slots 18, to which are pivoted the bars 19 by the pivot bolt 20. The bars 19 are turned at right angles, as indicated at 21 in Figures 2 and 6, and a bar 22 is employed extending across the interval between the bars 19, and being provided with slots 23 allowing provision for the adjustment of the bars 19 to the width of the handle bar 15. The right-angled portions 21 also carry arms 24 adjustment being provided by the screws 25. The bars 24 are also provided with right-angular extensions 26 which carry the abrading member 10 adjustably thereon. This latter adjustment may be by any approved means, as by the clip 27, slotted as at 28 and controlled by a screw 29 extending through a bracket 30 rigidly secured to the bar 26.

As it is desirable to control the position of the abrading member 10 relative to the knives 11 so that too much pressure shall not be brought to bear by the latter, an adjusting screw 31 is inserted through a slide 32, which slide is mounted upon the bar 26 and secured at any adjusted position by the set screw 33. The adjusting screw 31 bears upon the frame 13 of the lawn mower construction, as shown more particularly at Figures 1 and 5 so that the abrading member 10 may be raised or lowered to make such engagement with the knives 11 as the exigencies of grinding may make desirable.

In operation the device is attached to the handle-bar of the lawn mower by having the members 16 clamped upon opposite sides, as shown at Figure 1, and the device when in use is swung to the position shown at Figure 1, bringing the abrading member into position to be engaged by the knives 11 as the cutter head rotates. While the knives might be sharpened when the mower is actually in use, the resistance would probably be too great and it is, therefore, desirable to operate the mower for the especial purpose of grinding the cutter head, which operation will be in essentially the usual and ordinary manner, by being propelled along the ground or other supporting structure. It is also possible to wholly suspend the device in any approved manner and by manually rotating one of the drive wheels, rotate the cutter head in engagement with the abrading member without propelling the entire mower.

When the device is not in use for grinding, it may be folded back to dotted line position, as shown at Figure 1, where it is out of engagement with the cutter head, and does not interfere materially with the operation of the mower in the usual and ordinary manner.

What I claim to be new, is:

1. The combination with a lawn mower comprising a frame, a cutter head journaled upon the frame and a propelling handle attached to the frame, of an abrading member, arms attached to the abrading member, and means to pivot the arms to the handle in such manner that said abrading member may be manually moved into and out of abrading engagement with the cutting elements of the cutter head.

2. The combination with a lawn mower comprising a frame, a cutter head journaled upon the frame and a propelling handle attached to the frame, of an abrading member, arms attached to the abrading member, means to adjust the arms longitudinally relative to said member, and means to pivot the arms to the handle in such manner that said abrading member may be manually moved into and out of abrading engagement with the cutting elements of the cutter head.

3. The combination with a lawn mower comprising a frame, a cutter head journaled upon the frame and a propelling handle attached to the frame, of an abrading member, arms attached to the abrading member, means to pivot the arms to the handle in such manner that said abrading member may be manually moved into and out of abrading engagement with the cutting elements of the cutter head and at other times to swing back upon the handle away from the frame.

4. The combination with a lawn mower comprising a frame, a cutter head journaled upon the frame and a propelling handle attached to the frame, of an abrading member, arms attached to the abrading member, means to adjust the arms longitudinally relative to said member, means to pivot the arms to the handle in such manner that said abrading member may be manually moved into and out of abrading engagement with the cutting elements of the cutter head and at other times to swing back upon the handle away from the frame, and means to adjust the pivoting elements to handles of varying sizes.

5. The combination with a lawn mower embodying a rotating cutter head, a supporting frame and a handle bar, of an abrading member positioned at times to engage the cutting elements of the cutter head, a supporting structure for the abrading member, means permitting the adjustment of the abrading member support to engage handle-bars of various dimensions, and means for adjusting the width of the supporting structure to correspond to mowers of various dimensions independently of the adjustment of the dimensions of the handle-bar.

In testimony whereof I hereunto affix my signature in presence of two witnesses.

EDMUND BANNING LANCASTER.

Witnesses:
 HENRY McBRIDE,
 C. N. EVANS.